United States Patent Office 3,341,621
Patented Sept. 12, 1967

3,341,621
THERMALLY DEGRADED BLOCK COPOLYMERS OF PROPYLENE AND 1-BUTENE
Hugh J. Hagemeyer, Jr., and Raymond L. Etter, Jr., Longview, Tex., assignors to Eastman Kodak Company, Rochester, N.Y., a corporation of New Jersey
No Drawing. Filed May 31, 1963, Ser. No. 284,326
3 Claims. (Cl. 260—878)

This invention relates to new polymeric materials and to the method for preparing the same.

It is known in the polymer art that the products obtained by the thermal degradation of polymeric materials such as polypropylene and polyethylene exhibit properties quite different from the parent polymer and are often more useful than the parent polymer for a variety of applications.

Objects of the present invention are: to provide new thermal degradation products having certain superior properties rendering them especially useful in the form of supported or unsupported films, coatings and the like; and to provide a commercially practicable method for making such products.

According to the present invention these and other objects are achieved by thermally degrading block copolymers of propylene and 1-butene and forming the degradation products into films, coating and the like. These degradation products contain between 50 and 95 percent crystalline polymer, and between 50 and 5 percent amorphous material. The 1-butene content may be varied from about 5 to 95 percent depending on the properties desired. These new degraded polymers form tough, glossy and clear films having good adhesion to paper and excellent heat sealability.

The block copolymers are product in a two-stage polymerization process, in the first stage of which, propylene is contacted with a solid stereospecific polymerization catalyst and polymerized to a predetermined degree, and in the second stage of which, 1-butene is added to the first stage reaction system. This two-stage process can be conducted in a single reactor having separate reaction zones through which the first stage reaction system progressively passes to finally contact the 1-butene. Baffle or other separation means may be employed to define the zones. Alternatively, the separate stages can be conducted in separate reactors arranged in series, or the entire process can be carried out in an elongated tubular reactor without baffles by introducing the 1-butene thereinto at a certain point along its length. The amount of monomer fed in the second stage is dependent upon such variables as reaction conditions, degree of propylene polymerization in the first stage and desired molecular weight of the block copolymer.

The catalysts useful in making the block copolymer include any of the solid, stereospecific polymerization catalysts known to the art. These catalysts contain at least two components which most commonly are a halide of a transition element and an activator therefore such as metal alkyls, metal alkyl halides and metal hydrides of aluminum. A specific example of such catalysts is a mixture of $TiCl_3$ and $LiAlH_4$.

If desired, a third component can be employed in order to increase the stereospecificity of the catalyst and reduce the formation of waxes, oils and amorphous polymers. Suitable third components include the halides of alkali metals, magnesium oxide, aromatic ethers, hydrides of sodium, potassium and lithium and alcoholates of sodium, potassium, lithium, calcium, magnesium, barium, strontium, aluminum, titanium and zirconium. In addition, it is often desirable to employ tertiary amines and tertiary phosphoramides as third components with alkyl aluminum halides.

Catalysts employing lithium, lithium alkyls, lithium aluminum hydride, lithium hydride and lithium aluminum tetraalkyls in combination with the reduced valency form of the transition elements from the 4th to the 6th group of the Periodic Table are preferred for high temperature solutions or melt polymerization procedures. These catalysts are particularly effective at temperatures above 110° C.

Generally, a mole ratio of activator to metal halide of 0.1:1 to 12:1 is satisfactory for preparing the block copolymer. Where a third component is employed, the mole ratios of metal halide to third component of 0.25 to 1.0 are generally satisfactory. The concentrations of the catalyst in the reaction medium can be varied over a wide range. For example, catalyst concentrations of 0.1% or less, up to 3% or more can be used.

The temperature of the two-stage polymerization process can be widely varied from about 0° C. to about 300° C. With activators other than lithium and lithium compounds it is desirable to use temperatures less than 100° C. In slurry polymerizations at temperatures below 100° C., the inherent viscosities of polymer can be controlled by using hydrogen as a satisfactory chain terminator. In melt or solution polymerization at temperature above 100° C. the inherent viscosity is controlled by rigid control of the reaction temperature and to a lesser extent by controlling the pressure.

A suitable pressure range for the two stage process include pressures from one to about 2,000 atmospheres or more. Generally, it is desirable to use pressures in excess of 15 atmospheres in order to obtain satisfactory rates of reaction. Higher pressures, for example, 200 to 500 atmospheres may be required for polymerizations in the absence of a solvent.

The organic vehicles or solvents useful as reaction mediums include aliphatic alkanes or cycloalkanes such as propane, pentane, hexane, heptane, cyclohexane, and the like, or hydrogenated aromatic compounds such as tetrahydronaphthalene or decahydronaphthalene or a high molecular weight liquid paraffin or mixture of paraffins which are liquid at the reaction temperature, or an aromatic hydrocarbon such as benzene, toluene, xylene and the like. The nature of the vehicle or solvent is subject to considerable variation, but the solvent should be in a liquid form at the reaction conditions and relatively inert to the reactants and reaction products. Other solvents which can be used include ethyl benzene, isopropyl benzene, ethyl toluene, n-propyl benzene, the diethyl benzenes, mono and dialkyl naphthalenes, n-pentane, n-octane, isooctane, methyl cyclohexane, tetralin, decalin, mineral spirits and any of the other well known inert hydrocarbons.

The following example will serve to illustrate the block copolymer formation:

EXAMPLE 1

0.75 gram of $LiAlH_4$ (.02 mole) and 3.06 grams of $TiCl_3$ (.02 mole) in 900 ml. of mineral spirits were charged to a 2-liter stirred autoclave containing propylene under 800 p.s.i.g. The polymerization was carried out as follows:

|  | Time | Pressure (p.s.i.g.) | Temp., ° C. |
|---|---|---|---|
|  | 2:45 | 800 | 132 |
|  | 2:55 | 1,700 | 150 |
|  | 3:35 | 550 |  |
| Autoclave pressurized to 800 p.s.i.g. with 1-butene. | 3:35 | 800 | 167 |
|  | 3:45 | 500 | 170 |
|  | 4:10 | 410 | 165 |
|  | 4:30 | 375 | 160 |

The autoclave was discharged through a filter. The yield was 400 grams of about a 95–5 weight percent propylene-butene-1 polymer with a brittleness temperature of −35° C.

It has been found that especially unexpected and useful products are obtained when the above-prepared block copolymer in gross form, that is, including both the amorphous and crystalline portions, are thermally degraded. The products obtained by degrading only the crystalline portion are much poorer in the desired properties. This phenomenon is illustrated by the following table:

| Film (5 mils) From— | Tensile Fracture | Elongation | Brittleness Temperature, ° C. |
|---|---|---|---|
| Degraded Crystalline (60% Propylene, 40% 1-Butene) Block Copolymer, Vis.=10,000 cp., 190° C | 800 | 600 | 25 |
| Degraded (60% Propylene, 40% Butene Block Copolymer) Containing 20% Amorphous Polymer, Vis.=10,000 cp., 190° C | 1,400 | 900 | −4 |

Gross samples showed much better adhesion to paper and did not crystallize upon standing. The degraded crystalline polymer crystallized to some extent as evidenced by a decrease in the tensile properties with aging of the film.

The polymers of this invention are produced by thermally degrading a block copolymer of propylene and 1-butene containing 50–95 percent crystalline polymer and 50 to 5 percent amorphous polymer by either batch or continuous process. The degradation is carried out at temperatures between about 260 and 420° C. at contact times of a few seconds to four hours. The polymers produced may vary in viscosity from 500 to 30,000 cps. at 190° C.

The batch degradation is carried out by degrading the polymer in an agitated vessel under an inert atmosphere such as nitrogen. The final viscosity is regulated by the time and temperature of treatment. After the degradation is completed, the polymer is stripped of any low boiling materials by an inert gas sweep or vacuum. The polymer is then stranded and pelleted underwater.

In the continuous method, the block copolymer is fed to a heated pipe by means of an extruder. The polymer is continuously fed to the degradation section and the finished polymer continuously removed. Final viscosity of the polymer is regulated by the contact time in the degrading section and the temperature thereof. The polymer is stripped as before and stranded and pelleted underwater.

The amounts of amorphous material in the degradation product samples were determined by ethyl ether extraction at reflux temperature. These determinations were carried out in a Soxhlet extractor as follows: A 100-gram sample of the product was accurately weighed and placed in a fritted glass thimble inside of a Soxhlet extractor. Diethyl ether was refluxed over the sample overnight, and the sample was then cooled and dried. The loss in weight is equal to the amorphous polymer in the degradation product.

The melt viscosities of various degradation product samples were determined at 190° C. in a melt indexer machine. A 0.039-inch diameter orifice was used in place of the standard orifice. A flow rate of polymer using a 325-gram weight on the piston was determined and the melt viscosity calculated from the following equation:

$$V = 5.4939 \times 10^8 \frac{(0.039)4D}{FR}$$

where
V = viscosity in poises
D = melt density in g./cc., and
FR = flow in g./min.

The following examples with the approximate 1-butene contents listed are intended to further illustrate the variety of uses of the novel degradation products:

EXAMPLE 2

*Melt coating polymer—approximately 20 percent 1-butene*

These polymers yield coatings having properties comparable to high molecular weight polyethylene extrusion coatings as illustrated by the following table wherein the film samples were of the same thickness:

| Tests | Polymer of This Invention Melt Coated | Extrusion Coated High M.W. Polyethylene |
|---|---|---|
| Moisture Vapor Transmission (MVTR) (g./24 hr.) 100 in.² at 90% Relative Humidity and 100° F | Flat 1.1 / Creased 1.1 | 1.2 / 1.2 |
| Grease Resistance | >24 hr. | >24 hr. |
| Oxygen Transmission, cc./24 hr., 100 in.² | 5.3×10³ | 3.5×10⁴ |

Melt coating machines are much less expensive than extrusion coaters and are now in operation by many manufacturers.

EXAMPLE 3

*Curtain coating polymer—approximately 40 percent 1-butene*

These polymers are easily used in all curtain coating machines and give tough, clear, glossy, unsupported films. These coatings are useful for example, in packaging hardware, electrical components, perishable meats and a limitless number of other perishable and non-perishable items.

EXAMPLE 4

*Delayed adhesive applications—approximately 60 percent 1-butene*

Polymers having higher amounts of 1-butene exhibit adhesive action with substances such as paper for periods of from a few seconds to about five minutes. This phenomenon is useful in many lamination and similar operations wherein the laminating operation is delayed after coating due to limitations of the machine or the process.

As indicated by Examples 2–4 above, the 1-butene contents of the degradation products are dictated by the prospective uses thereof. Where a melt coating process is envisaged, the preferred 1-butene content ranges from 10–29 percent by weight of the gross block copolymer; where a curtain coating process is contemplated, the 1-butene preferably ranges from 30–59 percent; and for adhesive applications, the 1-butene preferably ranges from 60–95 percent.

The following examples will serve to further illustrate the method of making the degraded products and their exceptional properties:

EXAMPLE 5

Approximately 900 grams of propylene-1-butene block copolymer having 60 percent propylene and 40 percent 1-butene content, containing 17.6 percent amorphous polymer, and having an I.V. of 1.8 was placed in a 2-liter resin flask. The flask was fitted with a sweep anchor type stirrer heated by means of a heating mantle and the temperature measured with a thermocouple placed in a thermowell immersed in the polymer melt. The flask was purged with nitrogen previous to heating and a nitrogen purge maintained throughout the degradation. A temperature of 310° C. was maintained for 15 minutes. The polymer was then cooled to 250° C. and vacuum applied to strip any low boiling materials from the melt. No solid or liquid was obtained in this vacuum stripping. The polymer obtained had a viscosity of 2920 cp. at 190° C. A 5-mil. hand-drawn film from the melt had the following properties with tensile strength run at 2″/min. crosshead speed on a 1″ x 5″ strip.

Tensile strength:
- At fracture _____ p.s.i__ 884
- At yield _____ p.s.i__ 568
- Elongation _____ percent__ 660
- Color _____ Gardner__ 1.2
- Gloss _____ percent__ 68
- Transparency _____ do____ 70

EXAMPLE 6

The block copolymer of propylene and 1-butene of Example 5 was degraded as in Example 5 but to a viscosity of 15,000 cp. at 190° C. by heating to 290° C. for five minutes. A 5-mil. film had the following properties:

Tensile strength:
- At fracture _____ p.s.i__ 1220
- At yield _____ p.s.i__ 710
- Elongation _____ percent__ 860
- Color _____ Gardner__ 2
- Gloss _____ percent__ 70
- Transparency _____ do____ 68

EXAMPLE 7

A block copolymer of 80 percent propylene and 20 percent 1-butene containing 10 percent amorphous polymer was degraded as in Example 5 at 300° C. for 25 minutes to yield a polymer having 2500 cp. viscosity at 190° C. This polymer was melt-coated with a Haida roll coater on 40-pound bleached kraft at 1 mil, 14 pounds per ream, at 375 to 400° F. This paper was tested as follows:

MVTR—Flat 1.0, creased 1.1.
Grease resistance—>24 hours.
Oxygen transmission—6.2×10³ cc./24 hr./100 in.²

EXAMPLE 8

A block copolymer of 40 percent propylene and 60 percent 1-butene containing 15 percent amorphous polymer was degraded as in Example 5 at 290° C. for 10 minutes to yield a polymer having a viscosity of 4200 cp. at 190° C. This polymer, when melt coated on paper as in Example 7, showed a delayed adhesion effect in which adhesion was still satisfactory up to three minutes after coating.

EXAMPLE 9

A block copolymer of 60 percent propylene and 40 percent 1-butene containing 15 percent amorphous polymer was degraded by feeding into an extruder and then into a heated section 13 inches long. The temperature was 410° C. in the degradation section and contact time was approximately 20 seconds. A polymer having a viscosity of 12,000 cp. at 190° C. was obtained. A 5-mil film drawn from this polymer had the following properties:

Tensile strength:
- At fracture _____ p.s.i__ 1210
- At yield _____ p.s.i__ 650
- Elongation _____ percent__ 800
- Color _____ Gardner__ 2
- Gloss _____ percent__ 65
- Transparency _____ do____ 72

The invention has been described in detail with particular reference to preferred embodiments thereof but it will be understood that variations and modifications can be effected within the spirit and scope of the invention as described hereinabove and as defined in the appended claims.

We claim:
1. Thermally degraded polymeric product prepared by thermally degrading a block copolymer of propylene and 1-butene containing 5 to 95 percent 1-butene, 50–95 percent crystalline polymer and 50–5 percent amorphous polymer at between 260 and 420° C. in the absence of oxygen for a sufficient period of time to achieve a product viscosity between about 500 and 30,000 centipoises as measured at 190° C.

2. The process for preparing new thermally degraded polymeric product, comprising thermally degrading a block copolymer of propylene and 1-butene containing 5 to 95 percent 1-butene, at between 260 and 420° C. in the absence of oxygen for a sufficient period of time to achieve a product viscosity between about 500 and 30,000 centipoises as measured at 190° C.

3. The process for preparing new thermally degraded polymeric product, comprising thermally degrading a block copolymer of propylene and 1-butene containing 5 to 95 percent 1-butene, 50–95 percent crystalline polymer and 50–5 percent amorphous polymer at between 260 and 420° C. in the absence of oxygen for a sufficient period of time to achieve a product viscosity between about 500 and 30,000 centipoises as measured at 190° C.

References Cited

UNITED STATES PATENTS 2,981,727  4/1961  Boeke et al. _____ 260—94.9
3,144,436  8/1964  Greene et al. _____ 260—94.9

FOREIGN PATENTS 594,018  5/1959  Italy.

MURRAY TILLMAN, *Primary Examiner.*

D. J. BREZNER, *Assistant Examiner.*